Figure 3:
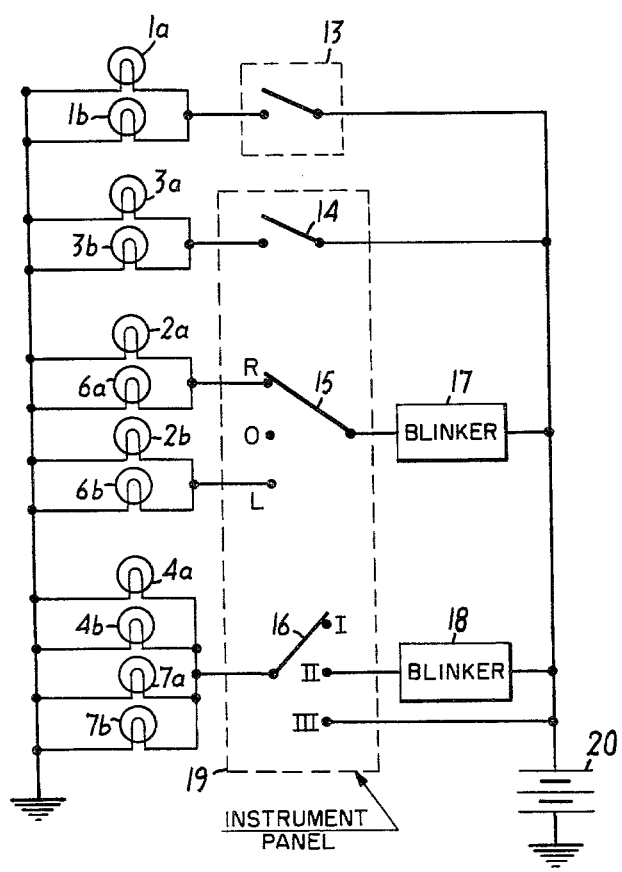

Jan. 11, 1966 J. MELKONIAN 3,229,250
MEANS FOR SIGNALLING THE POSSIBILITY OF OVERTAKING
Filed Dec. 11, 1961 2 Sheets-Sheet 1
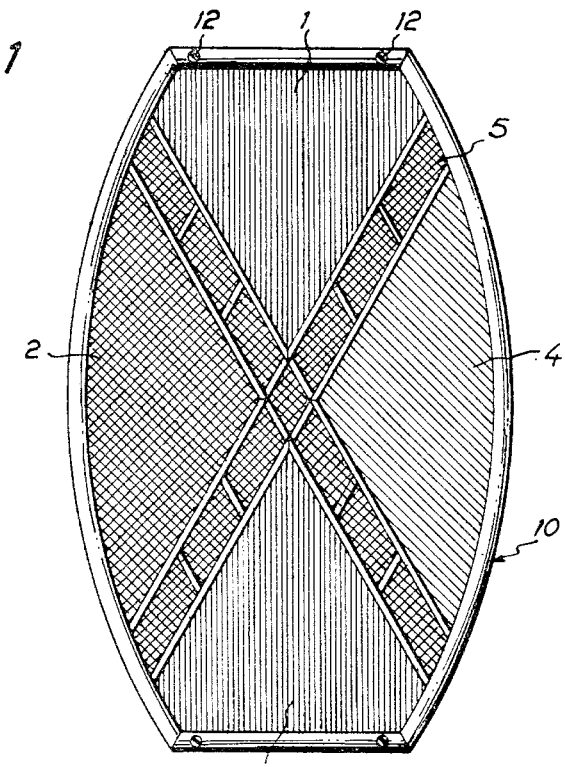
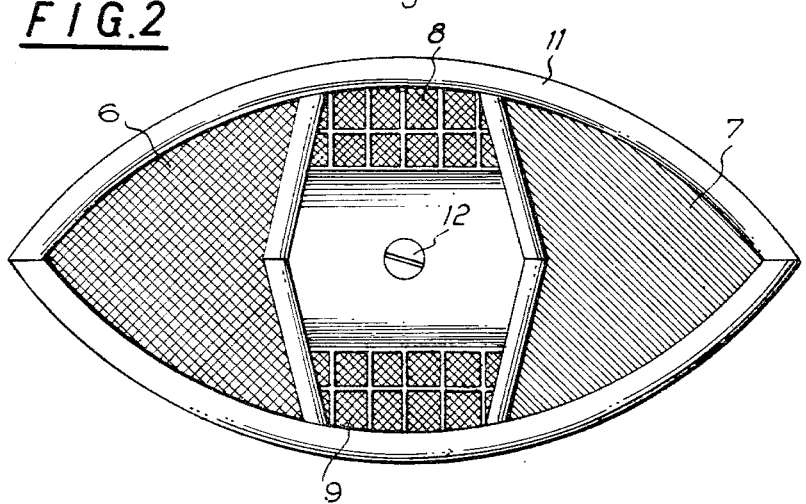

United States Patent Office 3,229,250
Patented Jan. 11, 1966

3,229,250
MEANS FOR SIGNALLING THE POSSIBILITY
OF OVERTAKING
Jacques Melkonian, 91 Rue Reaumur, Paris, France
Filed Dec. 11, 1961, Ser. No. 158,305
Claims priority, application France Feb. 18, 1961,
853,182
1 Claim. (Cl. 340—110)

The present invention relates to signal light systems for automotive vehicles.

It is a known fact that green rear lights may be provided on a vehicle to signal to the drivers of faster vehicles the possibility of overtaking the signalling vehicle. These lights are turned on and off by a suitable switch provided on the dashboard of the vehicle. However, there is always some uncertainty as to the useful application of such a signal. Sometimes, the driver who is about to overtake a vehicle wishes to ascertain whether his signal has been perceived by the vehicle to be overtaken and, in other cases, the signal of the vehicle to be overtaken should serve to show the driver of the overtaking vehicle that the road is free over a sufficiently long distance and that the overtaking is consequently possible and safe. This is of particular interest when, by reason of the size of the overtaken vehicle, a part of the road is concealed from the driver of the overtaking vehicle.

The present invention eliminates such a drawback providing a signalling system for vehicles comprising at least one extra, preferably green, rear light and providing a blinker system which may be inserted as desired, upon energization of the rear light, so that the light may be turned on and then again turned on at least once, advantageously during a few seconds. The blinker system is energized whenever the signal from an overtaking vehicle has been ascertained, and this light is illuminated constantly only when the road is actually free for overtaking.

It has already been mentioned that the field of sight of the driver of the overtaking vehicle is limited by the vehicle which is to be overtaken. This is also the case for the driver of a vehicle travelling in the opposite direction who cannot always see whether a large vehicle coming towards him is not concealing another vehicle which is about to overtake it. The invention provides therefore, when considered generally, in addition to the rear light, a similar light arranged to the front of the vehicle. Therefore, if a driver sees a green light turned on at the front of a vehicle travelling towards him, he should understand that this means that behind the vehicle considered another one is concealed which is attempting to overtake the signalling vehicle, so that he may act correspondingly.

It has also been mentioned that the utility or the signification of such a signalling is often subjected to some uncertainty. The invention removes such an uncertainty by the provision on the rear and front lights of a number of independent illuminated surfaces or lenses which are advantageously separated by reflecting surfaces, whereby the illuminated surfaces are given advantageously the shape of arrows, so as to indicate a predetermined direction, for instance as in the case of the usual blinker lights indicating any proposed turn by illuminating an arrow showing the direction of future travel. With such rear and front lights, the meaning of the signal is immediately clear, so that no misunderstanding can arise.

My invention will be readily understood, reference being made to the accompanying drawings, given by way of example. In said drawings:

FIG. 1 is a plan view of a rear light;
FIG. 2 is a plan view of a front light; and
FIG. 3 is a schematic of the circuitry of a system for illuminating the lights in FIGS. 1 and 2.

The rear light illustrated in FIG. 1 has four colored illuminated surfaces or lens 1, 2, 3 and 4, in the shape of triangles or broad arrows directed towards one another and separated by rearwardly reflecting surfaces 5 in the shape of a Saint Andrew's cross. Behind each illuminated surface is arranged an electric bulb FIG. 3 which is carried in the usual manner in a corresponding casing or housing, so that, at any moment, each bulb illuminates only the corresponding illuminated surface or lens. The lamp housings are compartmented, for example as shown in Patent 2,483,687.

The illuminated surface or lens 1, in the shape of a downwardly directed arrow, corresponds to the conventional braking light, and the illumination of the corresponding bulb is controlled in the usual manner, by actuation of the brake. The color of this illuminated surface is conventionally red.

The illuminated surface or lens 2, in the shape of an arrow which points laterally of the vehicle, corresponds to the usual direction indicator, the arrow facing the side towards which the vehicle driver intends turning. The illumination of this illuminated surface 2 is controlled in the usual manner by the blinker system, the color of said illuminated surface 2 being yellow or orange.

The third illuminated surface or lens 3, in the shape of an arrow pointing upwardly, corresponds to the conventional parking light of vehicles and its color is, as usual, red.

The last illuminated surface 4, of which the arrow is directed towards the medial axis of the vehicle, is green, and the corresponding electric bulb is ignited by means of a further switch carried by the dashboard of the vehicle as later explained.

The last-mentioned switch may occupy selectively three positions, to wit:

(1) an inoperative position,
(2) a blinker light position, in which case the bulb associated with the last-mentioned green illuminated surface is fed with current through a blinker system,
(3) a permanent light position for which said bulb associated with last-mentioned surface is permanently fed with current.

The green light which is thus intended to signal overtaking is shifted onto the blinker position whenever the driver observes that a vehicle running behind him wishes to overtake him, while he sees a vehicle coming in the opposite direction, so that an overtaking is momentarily impossible. As soon as the traffic in the opposite direction has ceased, the driver of the vehicle which is to be overtaken, shifts the switch onto its permanent light position and shows thereby the driver of the vehicle running behind him that there is no traffic in the opposite direction and that he can overtake him. The blinker signal can be given once, during a short blinking period of a few seconds, but can also, as is generally the case for the direction indicator, be constituted by a repeated blinking of the corresponding bulb which is energized intermittently and thus illuminates the corresponding surface intermittently as long as there is traffic running in the opposite direction, which traffic prevents any overtaking.

Instead of providing a single switch with three positions for the green overtaking light, it is also possible to provide two push-buttons on the dashboard, of which one releases the blinking signal, while the other push-button can be operated only in unison with the first push-button and is adapted to insert permanently the green light only when said first push-button is depressed, so that it is never possible to mistakenly insert permanent light instead of blinker light conditions.

FIG. 2 shows a front signal light or lamp which corresponds with the rear signal light or lamp illustrated in FIG. 1; the front light includes two illuminated surfaces or lenses 6 and 7 which are separated by reflecting surfaces 8 and 9.

The illuminated surface 6 is in the shape of a triangle or arrow directed laterally of the vehicle and corresponds to the usual blinker light showing the direction of proposed progression and its bulb operates simultaneously with that of the illuminated surface 2 of the rear light corresponding to the same side. The color of said illuminated surface 6 is white or yellow, as usual.

The illuminated surface 7 is in the shape of a triangle or arrow directed towards the medial axis of the vehicle; its color is green and it operates in synchronism with the green illuminated surface 4 of the rear light. The illuminated surfaces 6 and 7 are positioned, of course, as also the corresponding surfaces of the rear light, in front of electric bulbs carried inside separate casings, not shown. The bulbs illuminate, at any moment, only the corresponding illuminated surfaces.

All the illuminated surfaces and also the reflecting surfaces of each lamp comprise means mounting them as a unitary structure by means of chromium plated ribs 10 and 11 and are secured by screws 12 to the vehicle, to the front of the casings provided for the illuminating electric bulbs.

The details of the circuitry for the lamps of the rear and front units represented in FIGURES 1 and 2 and the circuitry for lamps to be fitted on the opposite side of the vehicle are shown in FIG. 3. The bulbs illuminating these lights are referenced 1a, 2a, 3a, 4a, 6a, and 7a. This arrangement is repeated in exact symmetry, but in mirror-inversion on the left-hand side of the vehicle. The left-side bulbs of FIGURE 3 are respectively, 1b, 2b, 3b, 4b, 6b and 7b. According to FIGURE 3, all the bulbs are energized from a battery 20. The braking lights 1a, 1b are operated by a switch at the braking pedal shown diagrammatically at 13. All the other lights may be operated from the instrument panel 19. The normal tail lights, 3a, 3b are manually switched on by a switch 14.

The direction-indicating light (2a, 6a on the left, and 2b, 6b on the right) are operated by a switch 15 having three operative positions which are: R for right, L for left and O for off. A blinker system 17 is connected in this circuit.

The lights, 4a and 7a and the lights 4b and 7b indicating overtaking are connected for synchronous operation and each of the pairs are operated by switch 16 having three positions: I for off, II for blinker sight and III for continuous illumination. In the II position, a circuit 18 comprising the blinker system is closed.

The shape of the reflecting surfaces 8 and 9 separating the illuminated surfaces 6 and 9 of the front light can obviously be selected as desired. It is simply necessary to distinguish clearly their shape from the Saint Andrew's cross 5 of the rear light, so that it is possible to distinguish immediately and without any difficulty the front from the rear of a parked vehicle, even in the dark. This is of particular importance when the road is not illuminated or only slightly illuminated and shows a number of turns, since the driver may thus see immediately along which side of a parked vehicle he has to pass, as the parking should be executed, in principle, solely on the right-hand side of the road considered in the direction of travel. Therefore, when the driver sees a rear light in the shape of a Saint Andrew's cross, he should pass to the left of the vehicle standing in front of him, while he is compelled to pass to the right-hand side of any reflecting light of a different shape.

What I claim is:

In combination, a front signal lamp unit and a rear signal lamp unit for a vehicle, circuit means for lighting said lamp units, said front lamp unit comprising a first lamp in said unit to indicate a direction toward which the vehicle is to turn and a second lamp to indicate to an oncoming vehicle operator that an overtaking vehicle is desirous of passing the first mentioned vehicle, said first lamp comprising a generally arrow shaped lens pointed in said direction toward which the vehicle is to turn, said second lamp comprising a generally arrow shaped lens pointed in a direction opposite to that of said first lens, said front lamp unit further comprising reflector surfaces between said lenses to reflect light in a pattern identifying said front signal lamp unit as a front signal lamp unit, means mounting said first and second lamps and said reflector surfaces as a unitary structure, said rear signal lamp unit comprising a third lamp for indicating that the vehicle is being braked, a fourth lamp for indicating that the vehicle is parked, a fifth lamp for indicating a lateral direction relative to the rear lamp unit toward which the vehicle is to turn, and a sixth lamp for indicating to an operator of an overtaking vehicle the presence or absence of a proximate oncoming vehicle and to indicate whether he may and may not safely pass, said third, fourth, fifth and sixth lamps each comprising a generally arrow shaped lens of predetermined colors, means mounting all of said lamps of said rear signal lamp unit as a unitary structure with the points of said generally arrow shaped lenses of said rear signal lamp unit all pointed centrally toward one another, means in said circuit for lighting said lamp units individually and selectively including means for lighting said turn direction indicating first and fifth lamps simultaneously and means lighting said second and sixth lamps simultaneously, blinker means and continuous current means in said circuit means, switch means in said circuit means to alternatively selectively connect said sixth lamp to said blinker means and to said continuous current means thereby to indicate to said operator of said overtaking vehicles that it is not safe to pass and to indicate to him it is safe to pass respectively, reflector surfaces on said rear signal lamp unit between said lenses to reflect light in a given pattern identifying said rear signal lamp unit as a rear lamp unit.

References Cited by the Examiner

UNITED STATES PATENTS

| D. 73,164 | 8/1927 | Di Stefano | 340—107 X |
| 1,894,173 | 1/1933 | Haines | 340—110 |
| 1,981,450 | 11/1934 | Fenna | 340—110 |
| 2,078,894 | 4/1937 | Haines | 340—110 X |
| 2,252,339 | 8/1939 | Baker | 340—110 |
| 2,483,687 | 10/1949 | Wisuri | 340—107 |
| 3,110,883 | 11/1963 | Nallinger et al. | 340—100 |

NEIL C. READ, *Primary Examiner.*

BENNETT G. MILLER, *Examiner.*

W. C. GLEICHMAN, I. J. LEVIN, *Assistant Examiners.*